(12) United States Patent
Yeater

(10) Patent No.: US 8,439,069 B2
(45) Date of Patent: May 14, 2013

(54) AIR RELEASE VALVE

(75) Inventor: Tommy William Yeater, Mansfield, OH (US)

(73) Assignee: The Gorman-Rupp Company, Mansfield, OH (US)

( * ) Notice: Subject to any disclaimer, the term of this patent is extended or adjusted under 35 U.S.C. 154(b) by 968 days.

(21) Appl. No.: 12/087,747

(22) PCT Filed: Jan. 12, 2007

(86) PCT No.: PCT/US2007/000939
§ 371 (c)(1),
(2), (4) Date: Jul. 11, 2008

(87) PCT Pub. No.: WO2007/082083
PCT Pub. Date: Jul. 19, 2007

(65) Prior Publication Data
US 2009/0120508 A1    May 14, 2009

Related U.S. Application Data
(60) Provisional application No. 60/758,506, filed on Jan. 12, 2006.

(51) Int. Cl.
| F16K 31/163 | (2006.01) |
| F16K 31/165 | (2006.01) |
| F16K 31/124 | (2006.01) |
| F16K 31/128 | (2006.01) |
| F04B 49/03 | (2006.01) |
| F04B 49/08 | (2006.01) |

(52) U.S. Cl.
USPC .............. 137/489.5; 137/556.3; 137/565.14; 137/115.06; 137/115.23; 137/505.13; 137/513.5; 251/57; 417/299

(58) Field of Classification Search ............... 137/489.5, 137/488, 492.5, 565.13, 565.14, 115.06, 137/115.13, 115.17, 115.07, 115.23, 492, 137/505.14, 115.16, 505.13, 513.5, 556.3; 251/57, 28; 417/299
See application file for complete search history.

(56) References Cited

U.S. PATENT DOCUMENTS
| 2,033,981 A | 3/1936 | Durdin, Jr. |
| 2,322,910 A | 6/1943 | Adney et al. |
| 2,421,325 A | 5/1947 | Griswold |
| 2,579,334 A * | 12/1951 | Plank .............................. 251/54 |
| 2,801,592 A | 8/1957 | Barton |
| 3,726,303 A | 4/1973 | Allen et al. |
| 3,870,436 A * | 3/1975 | Remy ........................... 417/299 |
| 4,194,893 A | 3/1980 | Woodhouse et al. |

(Continued)

FOREIGN PATENT DOCUMENTS
| EP | 0359730 | 3/1990 |
| GB | 1048272 | 11/1966 |
| GB | 1050893 | 12/1966 |

*Primary Examiner* — Craig Schneider
*Assistant Examiner* — Atif Chaudry
(74) *Attorney, Agent, or Firm* — Tarolli, Sundheim, Covell & Tummino LLP

(57) ABSTRACT

A valve assembly is provided that is suitable for use as an air release valve. The valve mechanism is actuated by liquid forced through an orifice by a diaphragm under pressure from the main discharge and is less prone to valve chatter under varying pressure conditions. The use of an externally adjustable orifice and/or regulator allows the valve assembly to operate satisfactorily in a wide range of pressures. The mode of operation of the valve mechanism is externally visible.

11 Claims, 7 Drawing Sheets

U.S. PATENT DOCUMENTS

| | | |
|---|---|---|
| 4,251,240 A | 2/1981 | Brennan et al. |
| 4,925,375 A * | 5/1990 | Carlsson ............ 417/430 |
| 5,193,744 A * | 3/1993 | Goldstein ............ 239/69 |
| 5,220,942 A * | 6/1993 | Garvin et al. ............ 137/556 |
| 5,601,111 A | 2/1997 | Sodergard |
| 5,709,239 A | 1/1998 | Macalello |
| 6,082,396 A | 7/2000 | Davidson |
| 6,409,478 B1 | 6/2002 | Carnes et al. |
| 6,575,706 B2 | 6/2003 | Carnes et al. |
| 6,616,427 B2 | 9/2003 | Carnes et al. |
| 6,783,330 B2 | 8/2004 | Carnes et al. |
| 2005/0062221 A1 * | 3/2005 | Motamed ............ 271/250 |

* cited by examiner

AIR RELEASE VALVE

TECHNICAL FIELD

The present invention relates generally to self-priming pumps and more particularly to a self priming pumping system including an automatic air release valve connected to the discharge side of a pump for venting air from the system.

BACKGROUND

The customary pumping arrangement employed in sewage lift stations and the like is comprised of at least one self-priming centrifugal pump, a suction inlet pipe connected to the intake side of the pump, a discharge main connected to the discharge side of the pump, and a one-way check valve in the discharge main which prevents liquid from flowing back to the pump when it is shut down.

When the pump is started up, the air in the pumping chamber and any air in the suction inlet pipe must be evacuated in order to achieve a full prime. The air which is evacuated cannot be forced past the check valve in the discharge main because self-priming pumps have limited air compression capability. For example, a typical four inch self-priming centrifugal pump, when in priming mode, may develop a maximum pressure of 7 feet of head at its rated speed. If such a pump is installed in a system with a discharge check valve that requires a pressure in excess of 7 feet to open, the pump will not develop sufficient pressure to open the check valve and initiate flow. It is therefore necessary to provide an air release valve between the check valve and the pump for venting air from the system. In order to have an efficiently operating system, the air release valve should automatically close when the pump is operating at rated capacity and head.

Many types of air release valves have been proposed. Many of these valves can become unstable under certain operating conditions, for example, low pressure conditions, and are prone to hydraulic chattering when pressure conditions are varying. Another drawback to known air release valves is that they can be easily plugged or fouled by stones, sticks, stringy material, an other solids commonly found in raw sewage and the like.

SUMMARY

A valve assembly suitable for use as an air release valve that is actuated by liquid forced through an orifice by a diaphragm under pressure from the main discharge is less prone to valve chatter under variable head conditions. The use of the orifice allows the valve assembly to operate satisfactorily in a wide range of discharge heads.

The valve assembly includes a valve inlet in fluid communication with a discharge from a pump and a passageway from the inlet to a valve outlet. A first cavity is defined by one or more first cavity walls and is in fluid communication with the passageway. A diaphragm is disposed within the first cavity that sealingly engages the one or more first cavity walls to form within the cavity a pair of adjacent pressure chambers: a first pressure chamber that is in fluid communication with the passageway and a second pressure chamber. An actuating fluid is disposed within the second pressure chamber and a valve mechanism is placed in fluid communication with the second pressure chamber. The valve mechanism is capable of being actuated between a closed valve position in which flow through the passageway is impeded by the valve and a open valve position in which flow through the passageway is substantially unimpeded by the valve mechanism. A flow orifice is disposed between the second pressure chamber and the valve mechanism that regulates a flow of fluid between the second pressure chamber and the valve mechanism. This flow orifice can be adjustable by external means. During operation, fluid in the second pressure chamber that is displaced by an increase in pressure in the first pressure chamber flows through the flow orifice and acts upon the valve mechanism to move the valve mechanism to the closed position.

The valve mechanism may include a plunger having a head and a plug connected to the plunger head. In this embodiment, in response to a flow of fluid from the second pressure chamber the plunger is moved between the open valve position in which the plug is flush with or protrudes slightly into the material passageway to impede flow through the passageway and the closed valve position in which the plug is fully protruded into the passageway. The plunger can be housed in a second cavity in which case the valve mechanism may include a diaphragm disposed on top of the plunger head that sealingly engages the second cavity to form a third pressure chamber such that a flow of fluid into the third pressure chamber from the second pressure chamber causes the second diaphragm to act on the plunger head to move the plunger to the closed valve position. The plug may have a chamfer at a distal end that defines a limited flow path for matter through the passageway when the valve is in the closed valve position. A biasing mechanism, such as a spring, compressible gas, or compressible material such as rubber, may be included that urges the plunger to the open valve position. An adjustable restrictor mechanism can be disposed in the passageway to regulate the flow rate of matter through the passageway. An optional back flow prevention mechanism, such as a check valve, may be placed in fluid communication with the passageway to prevent flow of matter toward the pump.

These and other objects, advantages, and features of the exemplary embodiment of the invention are described in detail in conjunction with the accompanying drawings.

DETAILED DESCRIPTION

Figure 1:
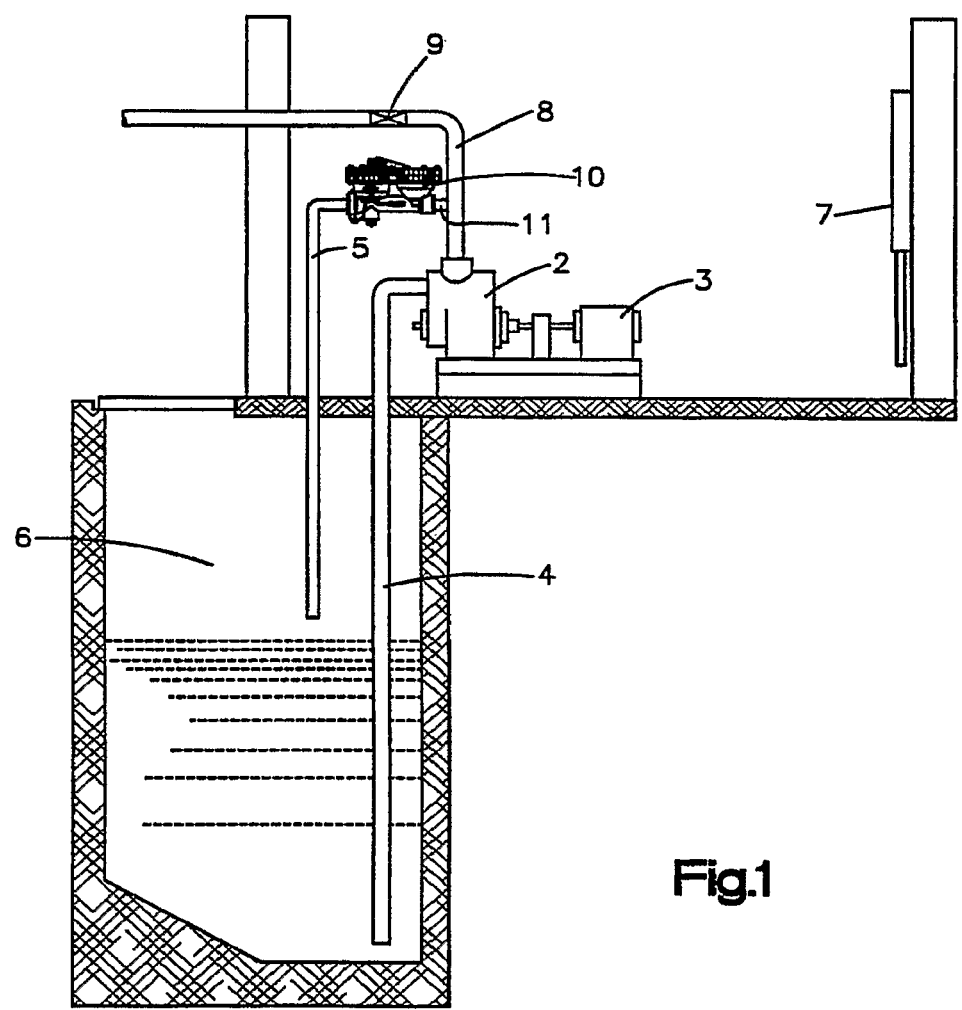
FIG. 1 is a schematic illustration of a typical pumping station that employs an air release valve constructed in accordance with one embodiment of the present invention.
Figure 2:
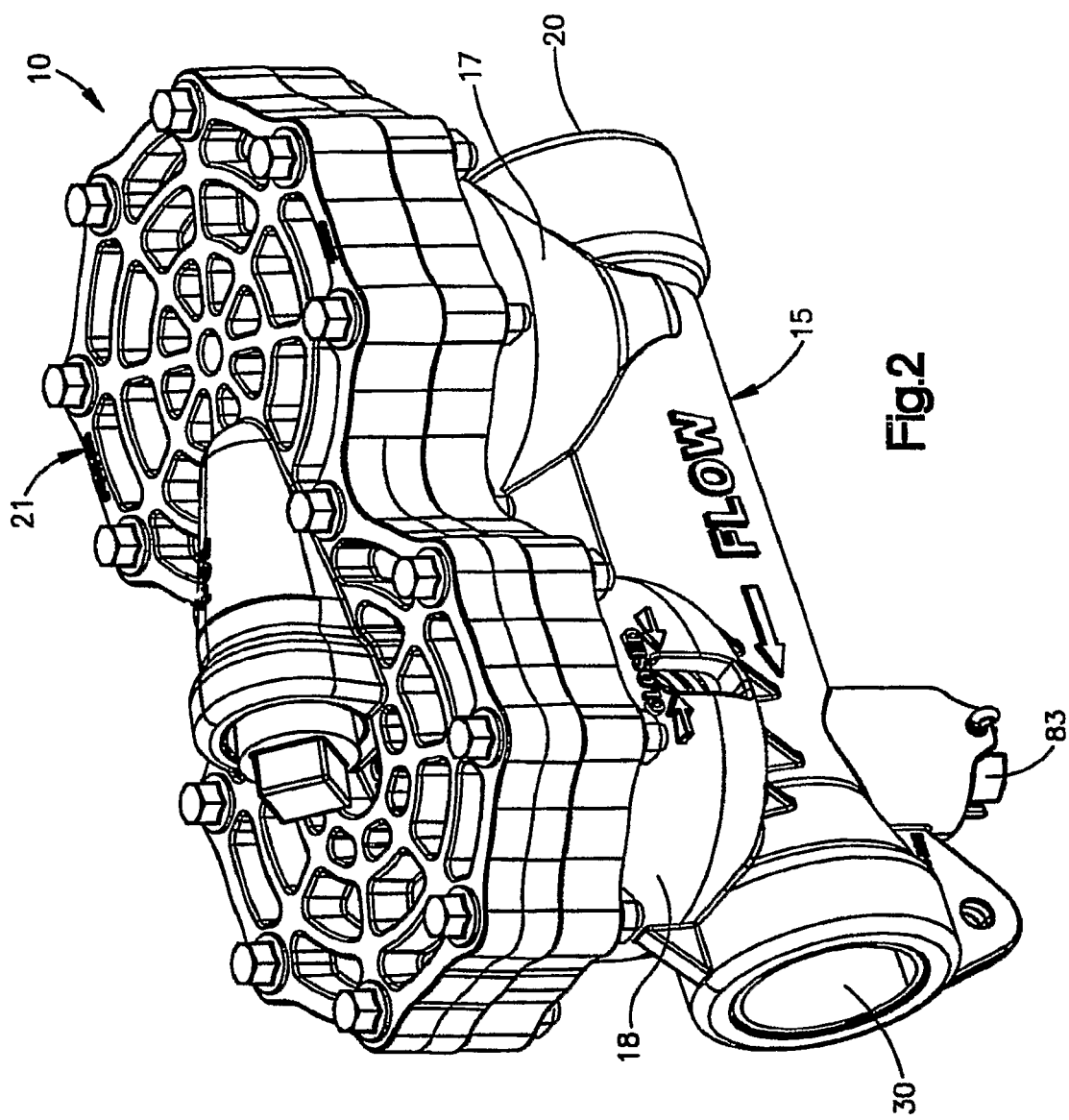
FIG. 2 is a perspective view of an air release valve constructed in accordance with one embodiment of the present invention.

FIG. 1 shows a pumping system 1 which includes a conventional self-priming centrifugal pump 2. In the illustrated arrangement the pump 2 is disposed above a wet well 6 which collects the liquid to be pumped. A suction inlet line 4 is connected to the intake side of the pump 2 and extends down into the wet well 6. A discharge main 8 is connected to the discharge outlet of the pump 2 and extends upwardly. The discharge main 8 is provided with a one-way check valve 9 that prevents the liquid downstream from the valve from return to the pump 2 when it has been shut down or is not operating. The pump 2 is driven by an electric motor 3 operated through suitable electronic controls 7.

An air release valve 10 constructed in accordance with the present invention is installed in the illustrated pumping system between the pump 2 and the check valve 9 so that the inlet of the valve 10 communicates with the discharge outlet of the pump 2 through the main 8. An exhaust line 5 is connected to the outlet port of the valve 10 and extends into the wet well 6. The purpose of the valve 10 is to vent the air that is evacuated from the suction inlet pipe 4 and the pumping chamber of the pump. The valve 10 automatically closes when the pump is fully primed to prevent the venting of liquid through the valve during the pumping cycle.

Referring now to FIGS. 2-6, the air release valve 10 is shown in greater detail. The valve 10 is made up of a housing 15 and a cover 21 that are bolted together. The housing 15 includes an inlet 20 that is connected to the main discharge 8 from the pump 2 (see FIG. 1) and an outlet 30 that connects to the vent line 5 (see FIG. 1.) A flow passageway 16 is formed between the inlet and outlet. The housing also includes a first cavity 17 and a second cavity 18 while the cover 21 includes an interior bore that forms a fluid path between the first and second cavities indicated generally as 22 in FIG. 3. The housing and cover are molded from a corrosion resistant material that can be molded in the desired final color to eliminate the need for paint. The use of this type of material provides sufficient corrosion resistance for use in most corrosive environments.

Figure 3:
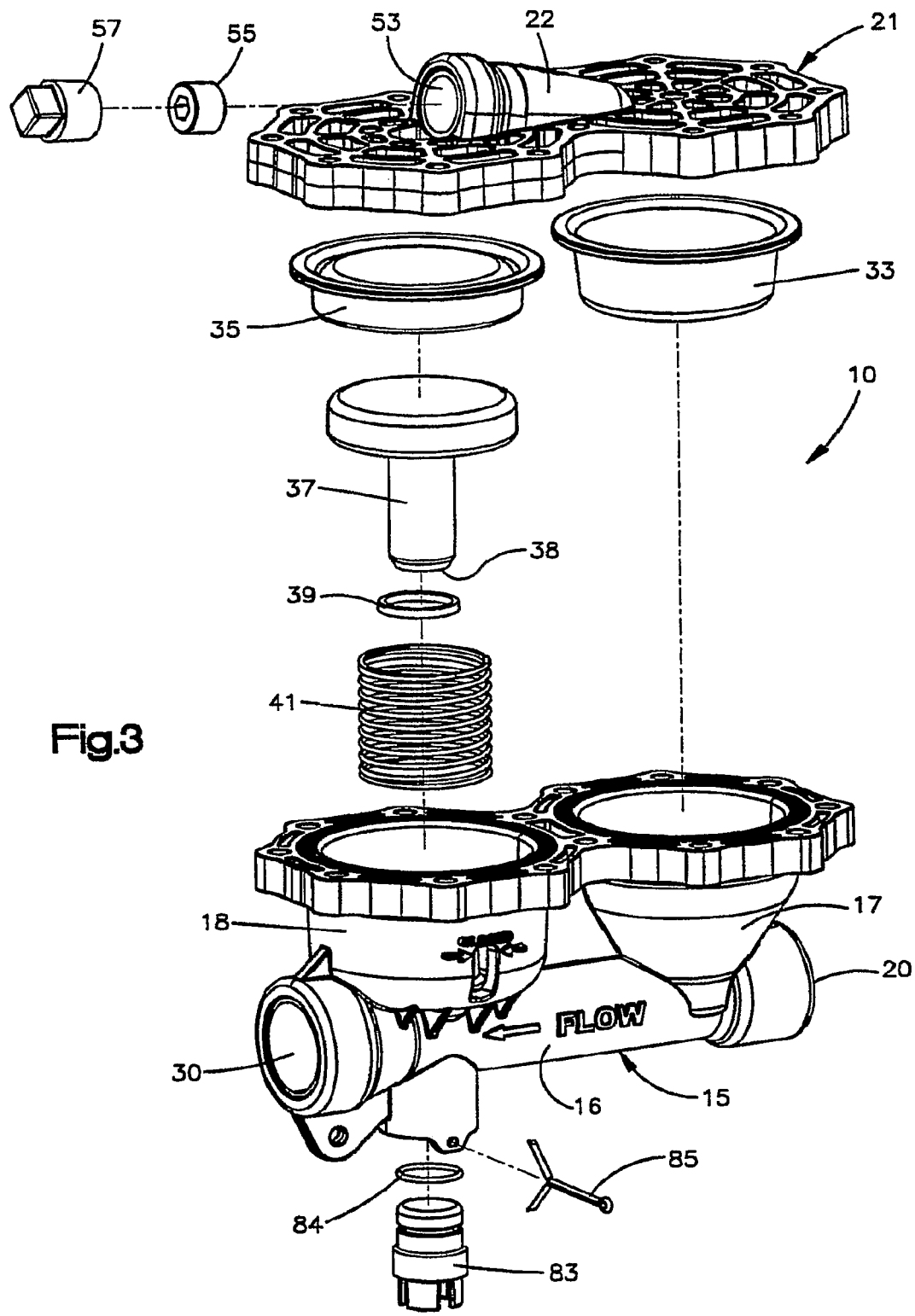
FIG. 3 is an exploded view of the air release valve of FIG. 2.

Referring now to FIG. 3, an exploded view of the valve 10 is shown. A diaphragm 33 is mounted in the first cavity 17 so that its outer edge is captured between a groove on the upper surface of the housing and a groove on the bottom surface of the cover. The diaphragm is flexible and divides the first cavity 17 into two pressure chambers, one of which is filled with a flowable material as will be described below. The second cavity 18 houses a valve mechanism that includes a plunger 37, a cup seal 39, a spring 41, and a second diaphragm 35 also having an outer edge that is captured between a groove on the upper surface of the housing and a groove on the bottom surface of the cover. The spring may be replaced by other biasing mechanisms such as compressible gas or material like rubber (not shown). The interior bore 22 is accessible for filling by removing fill plug 57 from a reservoir 53. An orifice 55 is inserted into the reservoir 53. The orifice is then located in the interior bore 22 that connects the first and second cavities 17, 18. An adjustable restrictor 83 with sealing o-ring 84 is threaded into a threaded bore in the housing 15 that intersects the passageway 16. The restrictor is held in place with a cotter pin 85.

Figure 5:
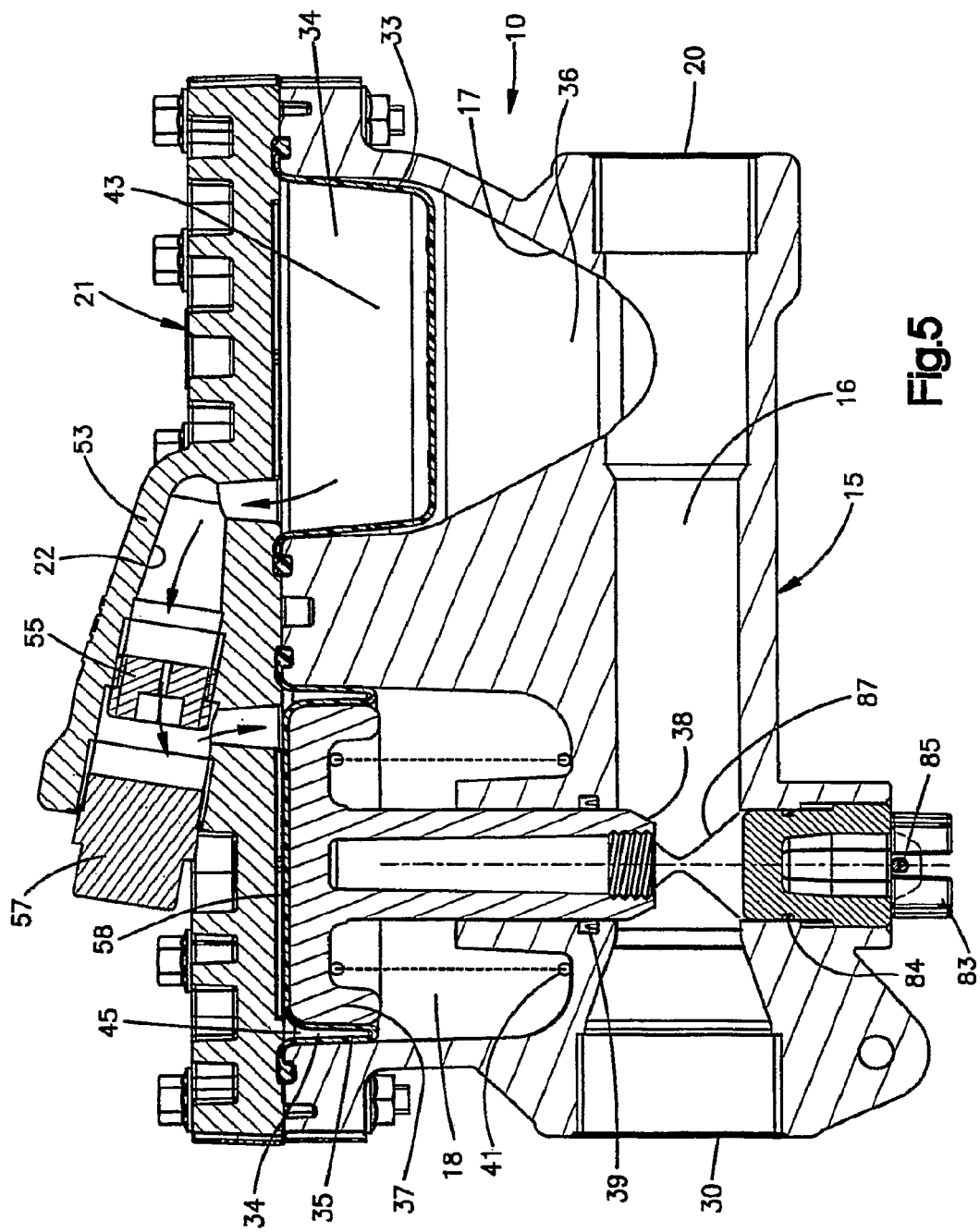
FIGS. 5 and 6 are cross section views of the air release valve of FIG. 2 in two modes of operation.

FIG. 5 show a cross section of the air release valve 10 with the valve in the open position in which the valve connects the discharge of the pump with the wet well for venting purposes. The air release valve 10 will typically be in this position at any time the pump is not operating. The first cavity 17 is divided into two pressure chambers, a first pressure chamber 36 and a second pressure chamber 43 by the diaphragm 33. The diaphragm is retained between the housing 15 and cover 21 and serves as a sealed barrier between first and second pressure chambers 36, 43. Likewise, the diaphragm 35 divides the second cavity into two pressure chambers, a third pressure chamber 45 (seen best in FIG. 6) and a fourth pressure chamber that houses the plunger. A fluid 34 is placed in the second and third pressure chambers 43, 45, as well as the internal bore 22 and rests there during this steady state condition. The biasing spring 41 in the second cavity 18 holds the plunger "up" so that the passageway 16 is fully or substantially open and the flow of air out of the outlet 30 is unimpeded. A cross shaped fluid channel 58 is grooved into the cover 21 above the diaphragm 33 and the diaphragm 35 to prevent the diaphragms from sealing off the pressure chamber when the valve is in the up position. When the pump comes online and media begins to be pumped through the pump discharge and through the passageway, resistance to the flow builds up causing an increase in pressure in the first pressure chamber 36. The level of resistance to flow within the passageway and, consequentially, the rate at which pressure builds in the first pressure chamber triggering actuation of the valve can be adjusted by threading or unthreading the restrictor 83.

Figure 4:
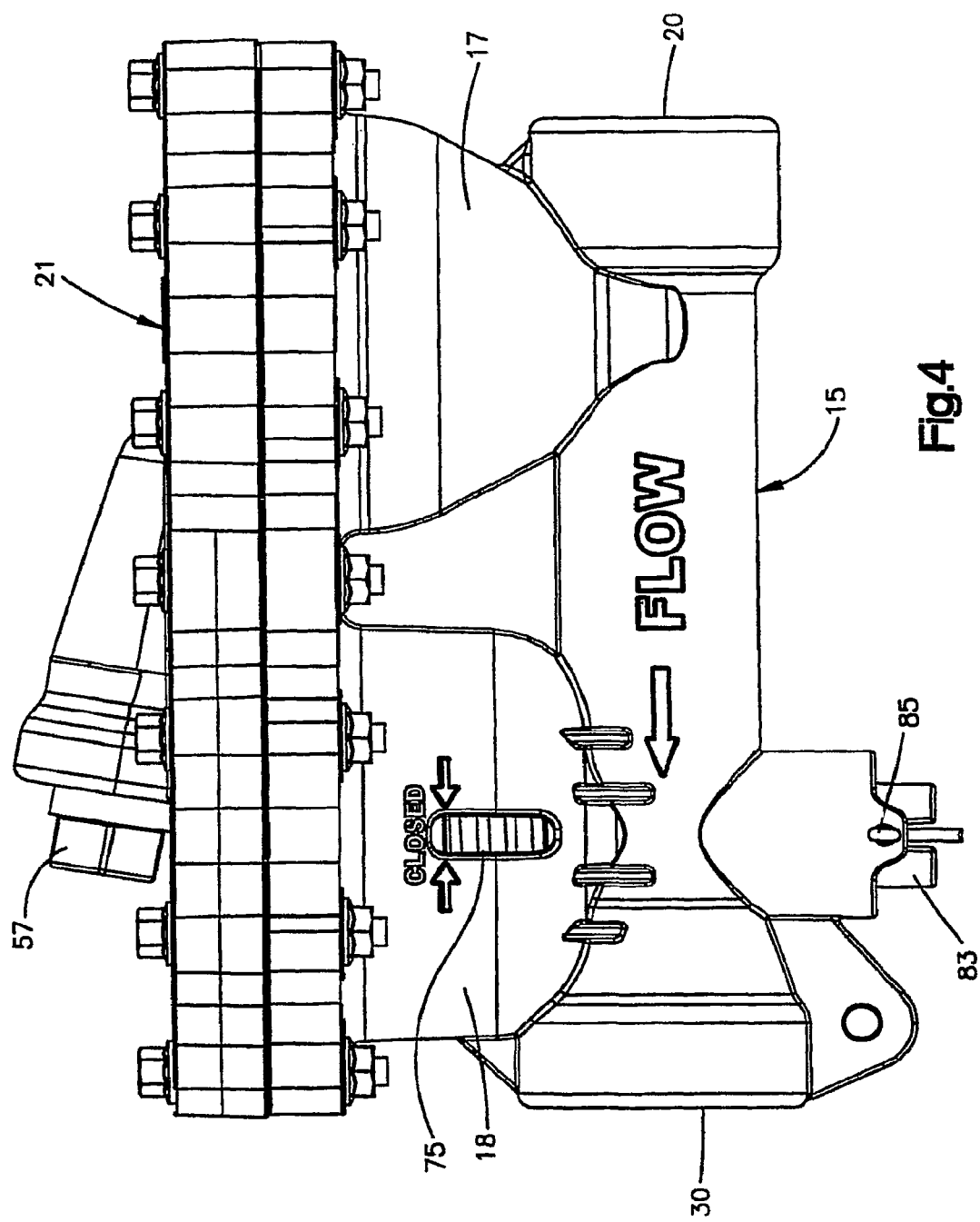
FIG. 4 is a side view of the air release valve of FIG. 2.
Figure 6:
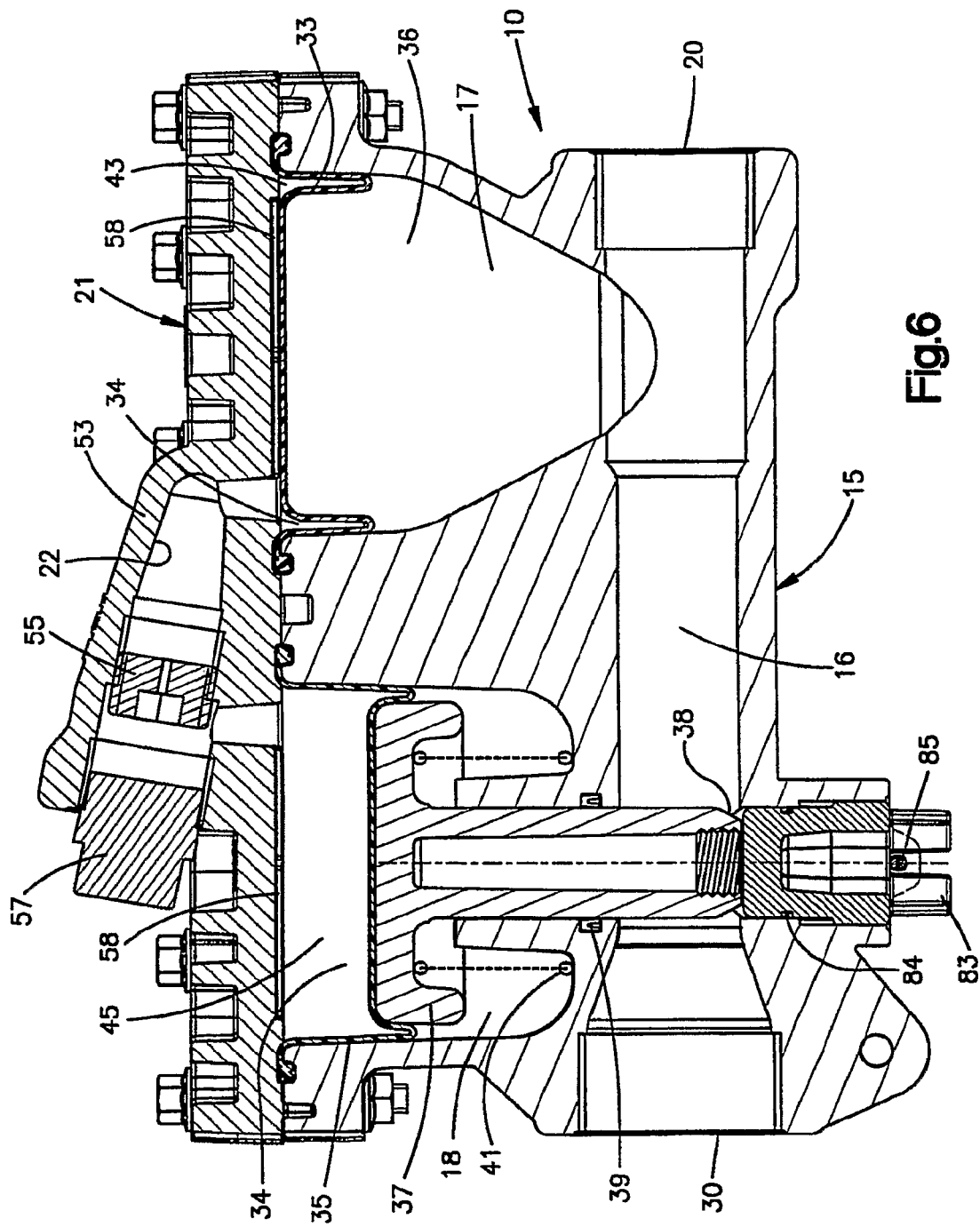

As the pressure builds in the first pressure chamber 36 and acts against the diaphragm 33, the fluid 34 on the other side of the diaphragm in the second pressure chamber 43, the internal bore 22, and third pressure chamber 45 is also pressurized. The fluid is forced to pass through the orifice 56 in the internal bore 22 at a controlled rate determined by the orifice characteristics. More fluid flows into the third pressure chamber 45. Because of the differential in the areas of the top of the plunger and the end of the plunger 38, a force is produced to compress the spring. When the applied force overcomes the biasing force of the spring, the plunger moves "down" and substantially blocks the passageway as shown in FIG. 6. The air release valve 10 remains in this position as long as the pump is operating and the head pressure in the discharge is maintained. A small chamfer on the end of the plunger 38 helps to keep the flow passages from becoming clogged by allowing a small continual flow. Another feature of the air release valve is an indicator window 75 (shown in FIG. 4) that shows the position of the plunger and hence the present mode of operation of the air release valve. In FIG. 4, it can be seen that the valve is in the closed position because the bottom edge of the head of the plunger, which is molded in white or other contrasting color, lines up with the arrows labeled "closed."

A cup seal 39 is housed in the housing and is disposed around the end of the plunger to clean the plunger prior to retraction into the second cavity 18. The cup seal is well suited for this application because it causes little friction when the plunger is moving down, facilitating operation in low head conditions. However, another type of seal such as an o-ring may also be used in place or in combination with the cup seal.

The orifice 55 controls the rate of flow of the fluid between the second pressure chamber 43 and the third pressure chamber 45. In this manner, the orifice also damps the effects of abrupt changes in the pressure in the first pressure chamber 36 and reduces valve chatter that might otherwise occur under varying pressure conditions. Because the fluid is maintained in a sealed region defined by the second pressure chamber 43, the internal bore 22, and the third pressure chamber 45, it is not susceptible to clogging and no mechanical components that require lubrication are utilized.

When the pump is turned off and the flow of media through the passage 16 falls, the pressure in the first pressure chamber 36 is reduced to the point that the biasing spring lifts the plunger and opens the valve to its open position. The operating characteristics of the pump can be easily compensated for by adjusting the restrictor 83 thereby reducing the need for changes in internal hardware such as the spring 41, which may be more difficult to access.

Figure 7:
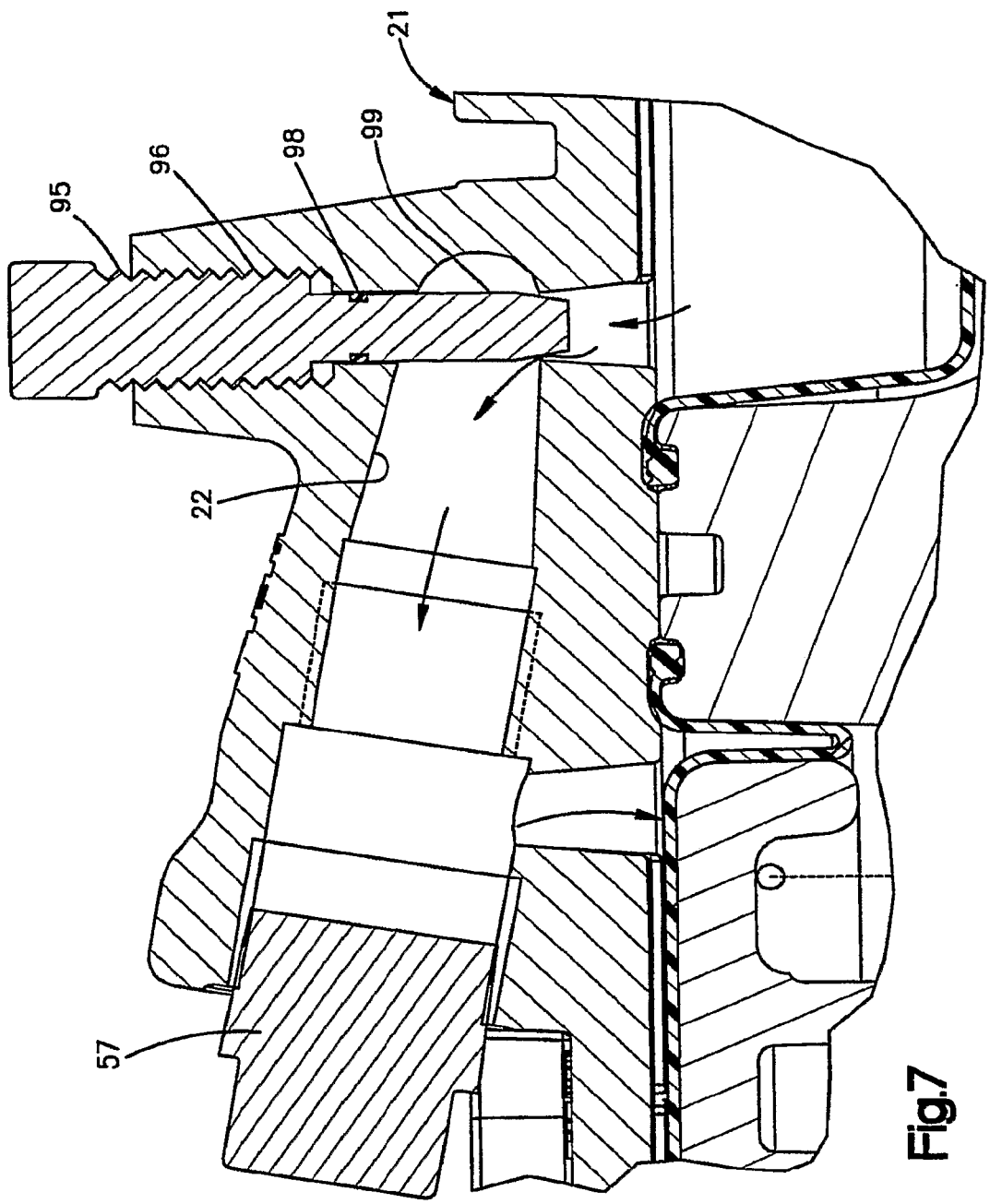
FIG. 7 is a cross section view of an air release valve constructed in accordance with an alternative embodiment of the present invention.

To provide additional adjustability, the orifice can also be externally adjustable as is shown in FIG. 7. In place of the orifice 55, a needle valve 95 is threaded into the housing 21 so that it protrudes into the internal bore 22 near the passage from the second pressure chamber into the bore. An o-ring 98 seals the threaded bore 96 from the fluid path. The end of the valve 99 co-acts with the passage to form an adjustable orifice.

It can be seen from the foregoing description that an air release valve that is actuated by liquid forced through an orifice by a diaphragm under pressure from the main discharge is less prone to valve chatter under varying pressure conditions. Although the invention has been described with a certain degree of particularity, it should be understood that various changes can be made by those skilled in the art without departing from the spirit or scope of the invention as hereinafter claimed.

I claim:

1. An air release valve assembly comprising:
   a valve inlet in fluid communication with a discharge from a pump;
   a passageway from the inlet to a valve outlet;
   a first cavity defined by one or more first cavity walls, the first cavity being in fluid communication with the passageway;
   a diaphragm disposed within the first cavity that sealingly engages the one or more first cavity walls to form within the cavity a pair of adjacent pressure chambers, a first pressure chamber that is in fluid communication with the passageway and a second pressure chamber;
   an actuating fluid disposed within the second pressure chamber;
   a valve mechanism in fluid communication with the second pressure chamber and capable of being actuated between a closed valve position in which flow through the passageway is impeded by the valve and a open valve position in which flow through the passageway is substantially unimpeded by the valve mechanism;
   the valve mechanism comprising a plunger having a head and a plug connected to the plunger head, and wherein in response to a flow of fluid from the second pressure chamber the plunger is moved between the open valve position in which the plug is substantially retracted from the material passageway and the closed valve position in which the plug protrudes fully into the passageway, wherein the plug has a chamfer at a distal end that defines a limited flow path for matter through the passageway when the valve is in the closed valve position;
   a flow orifice disposed between the second pressure chamber and the valve mechanism that regulates flow of fluid between the second pressure chamber and the valve mechanism; and
   wherein fluid in the second pressure chamber that is displaced by an increase in pressure in the first pressure chamber flows through the flow orifice and acts upon the valve mechanism to move the valve mechanism to the closed position.

2. The air release valve assembly of claim 1 wherein the plunger is housed in a second cavity and the valve mechanism further comprising a second diaphragm disposed on top of the plunger head that sealingly engages the second cavity to form a third pressure chamber such that a change of fluid volume in the third pressure chamber due to flow from the second pressure chamber causes the second diaphragm to act on the plunger head to move the plunger to the closed valve position.

3. The air release valve assembly of claim 2 comprising an externally visible indicator of the valve mechanism's position and wherein the externally visible indicator is a window in a wall of the second cavity through which a position of the plunger is visible.

4. The air release valve assembly of claim 1 further comprising a biasing mechanism constituting a spring.

5. The air release valve assembly of claim 1 further comprising an externally adjustable restrictor mechanism disposed in the passageway that regulates the flow of matter through the passageway.

6. The air release valve assembly of claim 1 further comprising an externally visible indicator of the valve mechanism's position.

7. The air release valve assembly of claim 1 wherein the flow orifice is externally adjustable.

8. The air release valve assembly of claim 7 wherein the orifice is a needle valve that adjustably protrudes into a passageway between the second pressure chamber and the valve mechanism.

9. A method of actuating a valve mechanism to purge air out of a fluid system in response to a flow of fluid through a valve passageway, wherein the valve mechanism closes off the passageway when fluid flows into the passageway, comprising:
   defining a first pressure chamber that is in fluid communication with the passageway;
   placing flowable fluid in a closed pressure system that includes second and third pressure chambers, wherein the second pressure chamber is in sealed mechanical communication with the first pressure chamber;
   controlling the flow of fluid between the second and third pressure chambers with a flow orifice that is disposed between them;
   placing the valve mechanism in a fourth chamber that is in sealed mechanical communication with the third pressure chamber, the third pressure chamber and the fourth chamber being formed by placing a second diaphragm in a second cavity such that it sealingly divides the cavity;
   purging air from the passageway when the valve mechanism is in an open condition to allow flow into the passageway, wherein a biasing mechanism urges the plunger to the open condition; and
   pressurizing the first pressure chamber with flow into the passageway such that the pressure is transferred to the second pressure chamber inducing a flow of flowable material through the orifice and into the third pressure chamber thereby mechanically actuating the valve mechanism, the valve mechanism including a plunger having a head and a plug connected to the plunger head, and wherein in response to a flow of fluid from the second pressure chamber the plunger is moved between the open valve position in which the plug is substantially retracted from the material passageway and the closed valve position in which the plug protrudes fully into the passageway, wherein the plug has a chamfer at a distal end that defines a limited flow path for matter through the passageway when the valve is in the closed valve position.

10. The method of claim 9 wherein the first and second pressure chambers are formed by placing a first diaphragm in a first cavity such that it sealingly divides the cavity into two pressure chambers.

11. The method of claim 9 wherein the flow of fluid is controlled by adjusting the flow orifice by an external adjustment mechanism.

* * * * *